United States Patent
Nikawa

(10) Patent No.: US 7,484,883 B2
(45) Date of Patent: Feb. 3, 2009

(54) NON-DESTRUCTIVE TESTING APPARATUS AND NON-DESTRUCTIVE TESTING METHOD

(75) Inventor: Kiyoshi Nikawa, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 123 days.

(21) Appl. No.: 11/447,891

(22) Filed: Jun. 7, 2006

(65) Prior Publication Data

US 2006/0280222 A1 Dec. 14, 2006

(30) Foreign Application Priority Data

Jun. 8, 2005 (JP) .............................. 2005-168275

(51) Int. Cl.
*G01N 25/72* (2006.01)
*G01N 25/20* (2006.01)

(52) U.S. Cl. .................................. 374/5; 374/4; 374/43
(58) Field of Classification Search ................. 374/4–5, 374/57; 228/103

See application file for complete search history.

(56) References Cited

U.S. PATENT DOCUMENTS

| | | | | |
|---|---|---|---|---|
| 4,679,946 A | * | 7/1987 | Rosencwaig et al. ........... 374/5 |
| 4,854,724 A | * | 8/1989 | Adams et al. ................... 374/5 |
| 6,405,359 B1 | * | 6/2002 | Tseng et al. .................... 716/21 |
| 6,517,236 B2 | * | 2/2003 | Sun et al. ......................... 374/4 |
| 6,585,146 B2 | * | 7/2003 | Shepard ...................... 228/104 |
| 6,840,667 B2 | * | 1/2005 | Schlagheck et al. ............. 374/5 |
| 7,009,695 B2 | * | 3/2006 | Some ....................... 356/237.1 |
| 2004/0028113 A1 | * | 2/2004 | Schlagheck et al. ............ 374/57 |
| 2004/0183019 A1 | * | 9/2004 | Mandelis et al. .......... 250/341.1 |

FOREIGN PATENT DOCUMENTS

JP  2000-46772 A  2/2000

OTHER PUBLICATIONS

"History of Development of Obirch method, Present and Future Perspective" Journal of Reaj, vol. 25, No. 8, pp. 853 to 856 (2003).

* cited by examiner

*Primary Examiner*—Edward Lefkowitz
*Assistant Examiner*—Bret Adams
(74) *Attorney, Agent, or Firm*—Sughrue Mion, PLLC

(57) ABSTRACT

To detect a defect without being limited to the current path of a sample. The presence or absence of a defect in a sample is detected by allowing said sample to stand for a predetermined period of time after heating said sample with a heat source and by observing the temperature distribution formed on said sample by an observation unit.

10 Claims, 6 Drawing Sheets

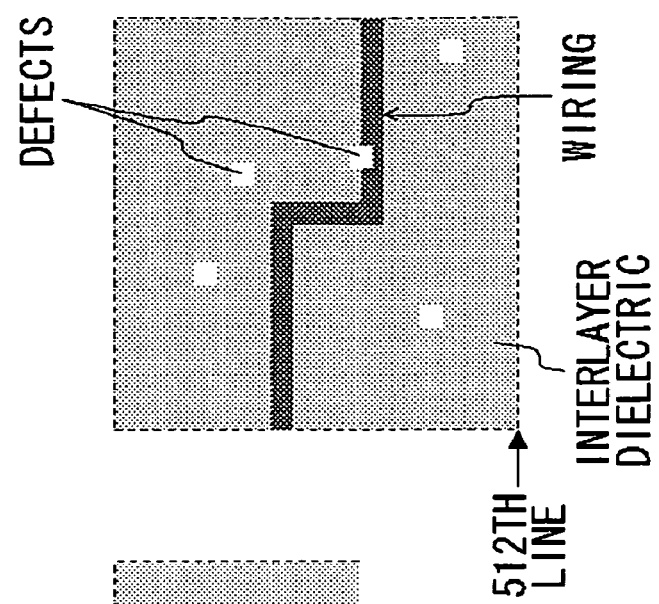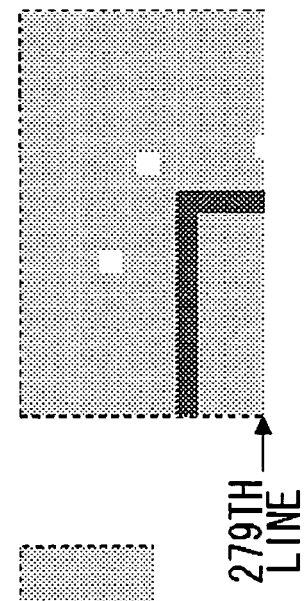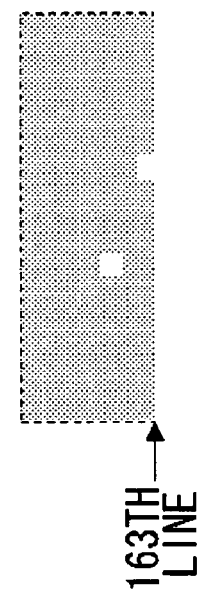

OBIRCH APPARATUS

*CURRENT IS EXTERNALLY SUPPLIED TO SEMICONDUCTOR DEVICE

*DETECTION OF DEFECT IS LIMITED TO WIRING ALONG WHICH CURRENT FLOWS

NON-DESTRUCTIVE TESTING APPARATUS AND NON-DESTRUCTIVE TESTING METHOD

FIELD OF THE INVENTION

The present invention relates to a non-destructive testing apparatus and non-destructive testing method for electronic devices, and in particular to a non-destructive testing apparatus and non-destructive testing method which is suitable for examining defects in a wiring system of a semiconductor device.

BACKGROUND OF THE INVENTION

An optical Beam Induced Resistance Change (OBIRCH) method has been known as one of conventional non-destructive testing methods for electronic components (samples) of semiconductor chips and the like. Changes in resistance of wiring which are detected by heating the wiring when laser light is scanned on and along a semiconductor chip are converted into images (refer to Non-Patent Document 1). Since the temperature elevation is different between the positions where there is a defect such as void in the wiring or not, the defect can be identified in the image in accordance with the present method.

There is disclosed an apparatus for analyzing defects in a semiconductor device as one of conventional non-destructive testing apparatus. In the disclosed apparatus, a film of a liquid crystal, the phase transition of which occurs due to temperature changes is applied on the surface of the semiconductor device. The applied liquid crystal film is heated by irradiating the semiconductor device on its surface with ultra-red rays. The caused phase transition of the liquid crystal film is observed by an optical microscope, so that a defect or defects which cause slight heating when the semiconductor device is operated are detected. In accordance with this apparatus, the distribution of the heat caused by the defects can be precisely detected without being influenced by heat conduction from the periphery and heat capacity by causing local heating using ultra-red rays together with a variable slit in case where a defect of the semiconductor device which cause heating are detected.

[Patent Document 1]
Japanese Patent Kokai Publication No. JP-P2000-46772A

[Non Patent Document 1] "History of development of OBIRCH (Optical Beam Induced Resistance Change) method, Present and Future Perspective" Journal of REAJ, Vol. 25, No. 8, pp 853 to 856 (2003).

SUMMARY OF THE DISCLOSURE

A defect which can be detected by an OBIRCH apparatus using conventional OBIRCH method is limited to only wiring, a change in resistance of which can be detected externally of a semiconductor chip. In other words, prior art OBIRCH apparatus irradiates a semiconductor chip with laser light while a voltage is applied across two terminals of the semiconductor chip as shown in FIG. 6, so that an image including a change in brightness corresponding to a defect if any can be formed. However, only a defect of wiring existing between two terminals can be detected.

It is a main object of the present invention to enable any defect to be detected in and a sample without being limited to the defect in a current path of a sample.

In a first aspect of the present invention, there is provided a non-destructive testing method characterized in that the presence or absence of a defect in a sample is detected by allowing said sample to stand for a predetermined period of time after heating said sample with a heat source and observing the temperature distribution formed on said sample by an observation unit.

In a second aspect of the present invention, there is provided a non-destructive testing apparatus characterized in that said apparatus comprises a heat source for heating a sample; and an observation unit for observing the temperature distribution formed on said sample. The heat source is typically a beam or light source such as a laser beam source which can be scanned over a target area of a sample.

The meritorious effects of the present invention are summarized as follows.

In accordance with the present invention, the position of the defect to be tested is not limited to only wiring since external supply of current to a sample is not necessary. Defects in an interlayer dielectric other than wiring can also be detected.

BRIEF DESCRIPTION OF THE DRAWINGS

FIG. 1A is a schematic view of the non-destructive testing apparatus. FIG. 1B is an image of the temperature distribution which is obtained by the non-destructive testing apparatus;

FIG. 3A shows an optical image and FIG. 3B showing a temperature distribution image;

FIGS. 4A, 4B and 4C are schematic views showing a method for detecting a defect of an electronic component in accordance with the non-destructive testing method of an embodiment of the present invention;

FIG. 6A is a schematic view of an OBIRCH apparatus; and FIG. 6B is a temperature distribution image which is obtained by the OBIRCH apparatus.

PREFERRED EMBODIMENTS OF THE INVENTION

Embodiment 1

Figure 1:
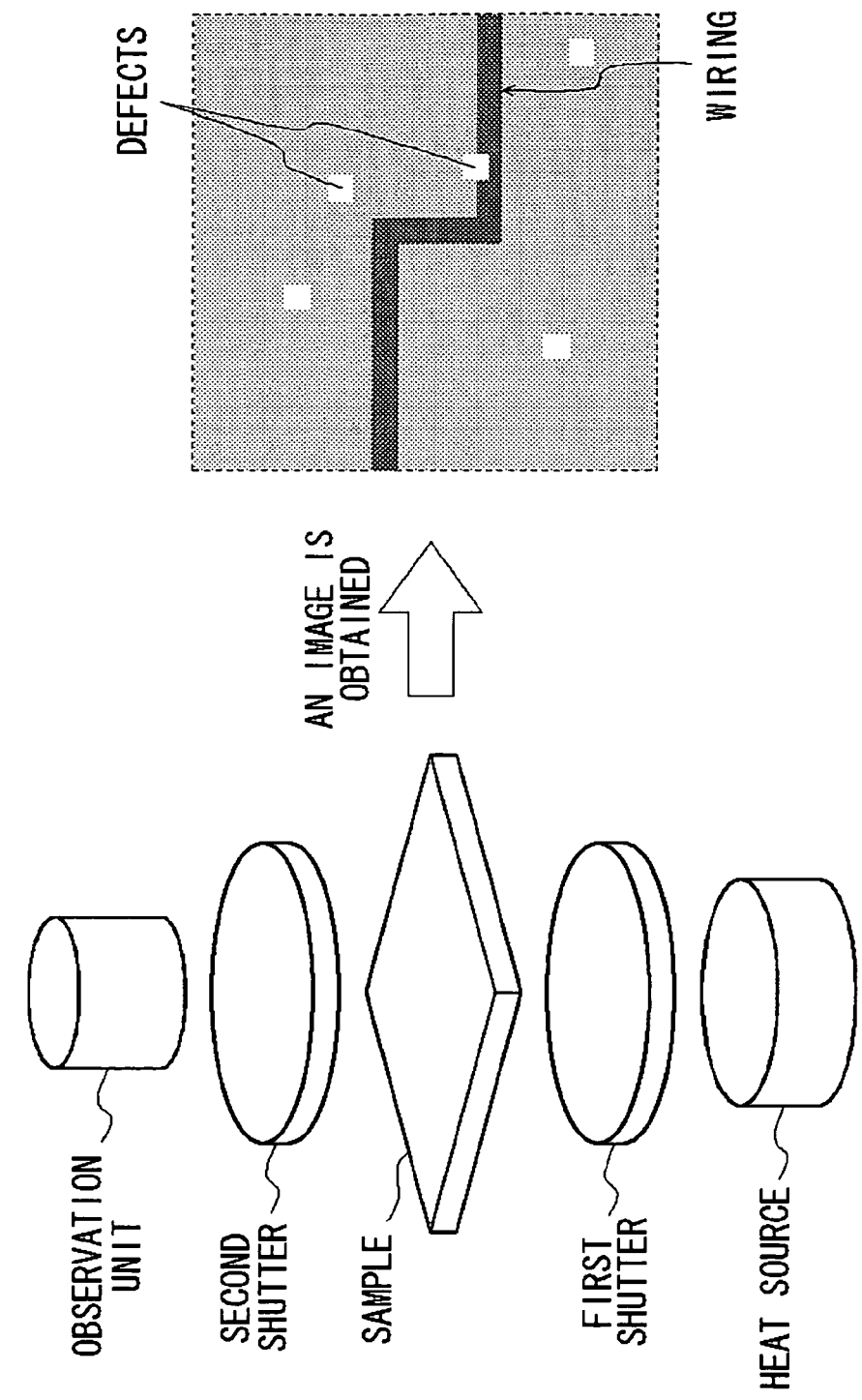
FIGS. 1A and 1B are views explaining a non-destructive testing method of a mode of embodying the present invention 1.
Figure 2:
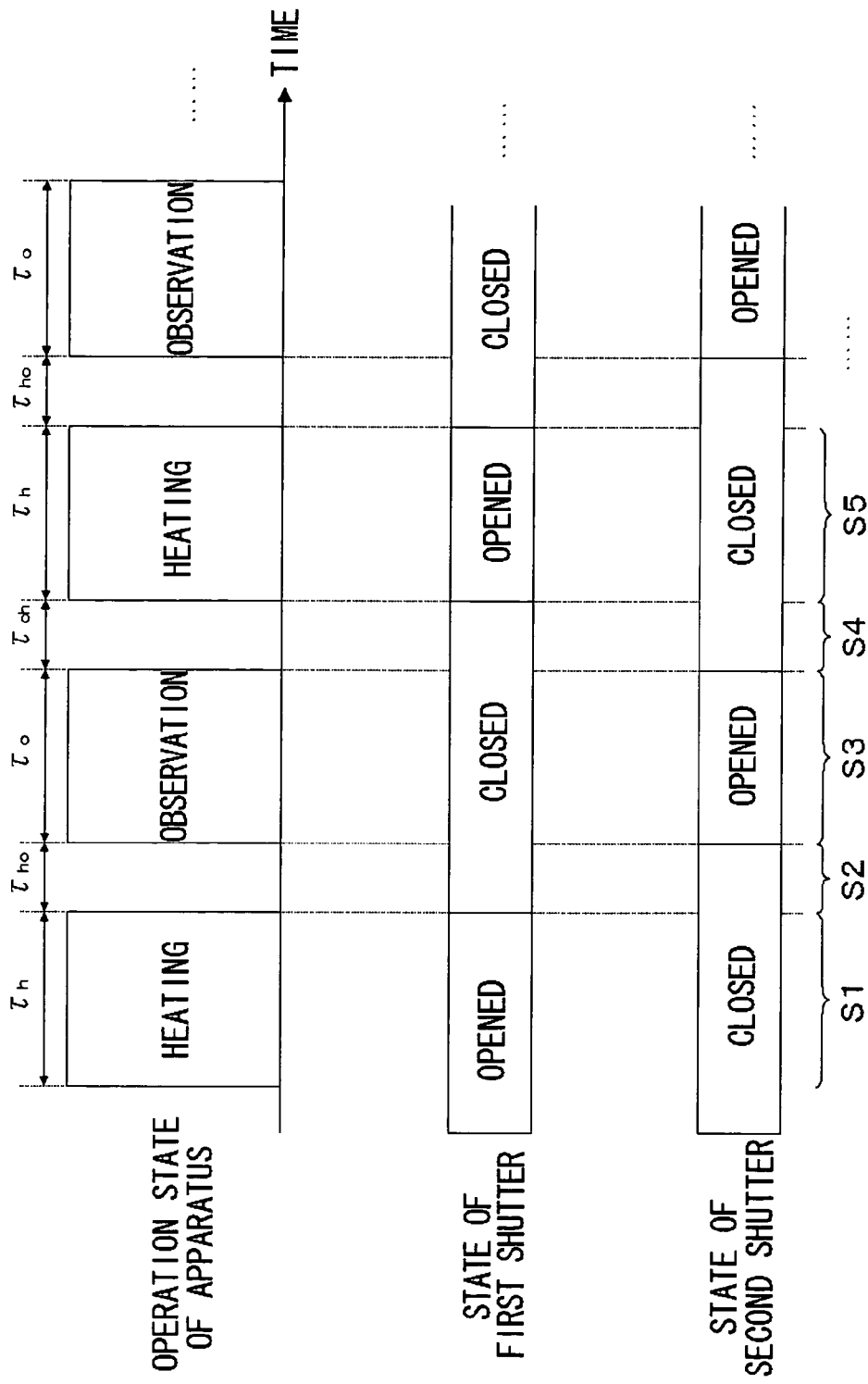
FIG. 2 is a timing chart explaining the operation of the non-destructive testing apparatus of the present invention.

A non-destructive testing apparatus and a non-destructive testing method of a embodiment of the present invention will be described with reference to the drawings. FIGS. 1A and 1B are views explaining the non-destructive testing method of the mode of embodying the present invention 1. FIG. 1A is a schematic view of a non-destructive testing apparatus. FIG. 1B is a view showing a temperature distribution image which is obtained by the non-destructive testing apparatus. FIG. 2 is a timing chart explaining the operation of the non-destructive testing apparatus of the mode of embodying the present invention 1.

In the non-destructive testing method of the embodiment 1, an electronic component of a semiconductor device to be tested (sample) and a qualified electronic component (control sample) which is used as a control heated on the reverse side thereof with a heat source (for example, ultra-red ray lamp, ultra-red laser light and the like). Thereafter, the temperature on the surface of the sample to be tested and the control sample is measured by an observing unit (fro example, emission microscope, MCT (mercury cadmium telluride) type emission microscope) (refer to FIG. 1A) so that the difference between the images of the temperature distribution of the sample and control sample (refer to FIG. 1B). The obtained images are compared. If there is a difference between the temperature distribution images of the samples in a position, it is determined that there is a defect on the sample in this position thereof (refer to FIG. 1B).

Operation of the non-destructive testing apparatus shown in FIG. 1A will be described.

When a first and second shutters are opened and closed (only heating is conducted), respectively, the electronic device (for example, IC chips) is irradiated with ultra-red light or ultra-red laser light from a heat source disposed on the reverse side of the components so that the surface of the electronic device (main side thereof) is heated for a given period of time ($\tau_h$ in FIG. 2) (at a step AS1 in FIG. 2). If ultra-red laser light is used, the ultra-red light is transmitted through a substrate (here, Si substrate) from the reverse side of the IC chip and is focused in the vicinity of the surface of the IC chip. It is thus possible to intensively heat the IC chip in the vicinity of the surface thereof.

When the first and second shutters are closed (no heating and observation is conducted), the device is allowed to stand for a given period of time $\tau_{ho}$ (at step S2 of FIG. 2). If the electronic device is heated on the surface side thereof with ultra-red ray irradiation, the temperature distribution of the electronic device in the vicinity thereof is determined depending upon the configuration of wirings and inter-layer dielectric layer which are disposed on the surface of the electronic device and conditions of defects on the wiring and the inter-layer dielectric layer. Since the temperature distribution may change depending upon the heating period of time ($\tau_h$ in FIG. 2) and subsequent lapse of time, the electronic device is allowed to stand for a given period of time $\tau_{ho}$. If observation is initiated immediately after the termination of heating, supplied heat per se would be observed, so that it is difficult to observe the wiring and the inter-layer dielectric layer and a defect thereon if any. Allowing the electronic device stand for a given period of time $\tau_{h0}$ may be in the range of, for instance, 1 µs to about 100 µs, it may be in the order of ns to ms depending upon heating period of time, heating temperature, structure and surface state of the electronic device to be observed. Note that the standing period of time largely depends on the nature, design and size of the sample, and it is selected so as to ensure sufficient resolution (difference) in the temperature distribution.

Subsequently, when the first and second shutters are closed and opened (only observation is conducted), respectively, the temperature distribution of the electronic device is observed for a given period of time ($\tau_0$ in FIG. 2) (at step S3). An observing unit is disposed on the side of main surface of the electronic device (sample) and, for example, it may include a thermal sensor such as MCT emission microscope or optical sensor such as emission microscope. The most popularly used emission microscopes have the range of sensible wave length which is manly visible light range, but slightly extends to the ultra-red range. The distribution of the temperatures above about 200° C. can be visualized. If the MCT emission microscopes which have recently become popular are used, it is possible to conduct the observation of the temperature distribution with a sensitivity of not higher than 1° C. The observation period of time ($\tau_0$ in FIG. 2) is determined depending upon the sensitivity of sensors. Note that the beam is not limited to the visible light. Rather it is enough to use any beam which is useful for detecting the temperature distribution.

Subsequently when the first and second shutters are closed (heating and observation is not conducted), the device to be tested is allowed to stand for a given period of time ($\tau_{oh}$ in FIG. 2) (at step S4 in FIG. 2).

Thereafter, when the first and second shutters are opened and closed (only heating is conducted), respectively, heating is initiated similarly to step S1 (at step S5 in FIG. 2). Subsequently, steps S1 through S4 will be repeated until observation at necessary positions can be conducted with a necessary S/N (signal to noise ratio).

Since the electronic device can not be simultaneously irradiated with laser light in positions in which observation is necessary at heating step (step 1 and the like), it is necessary to scan light over the device surface. In this case, heating is conducted in some of the observed positions while observation is conducted on all positions. No problem will occur if observed images are stored for accumulation. Such a storing and accumulation function is included in usual emission microscopes or MCT emission microscopes.

Timing of heating and observation is adjusted by opening and closing of the first and second shutters as shown in FIG. 2. On heating of the device (at step S1 in FIG. 2, the first shutter is opened), the first shutter is closed so that no heat is conducted to the sensor from the heat source. On the other hand, when observation is conducted (at step S3 in FIG. 2, the second shutter is opened), the first shutter is closed so that no heat is conducted to the electronic device and sensor from the heat source. It is of course that the shutter function is not provided independently of the heat source and sensor and that heat source and sensor having the shutter function incorporated therein may be provided.

The reason why the electronic device is irradiated with laser light on the reverse side thereof is that physical arrangement between the sensor (thermal sensor and optical sensor) and the heat source is made easier and the wiring area which can be directly heated is made wider if the electronic device is a multi-layer wired IC. It is preferable to preliminarily mirror-polish (treat) the reverse side of a wafer or chip if the device is in the form of wafer or chip. It is of course possible to irradiate the face of device with laser light if there is no disadvantages due to the restrictions of physical arrangement or multi-layered wiring. It is of course possible to observe the temperature distribution on the reverse side of the device by heating the device on the face side.

Embodiment

Figure 3B:
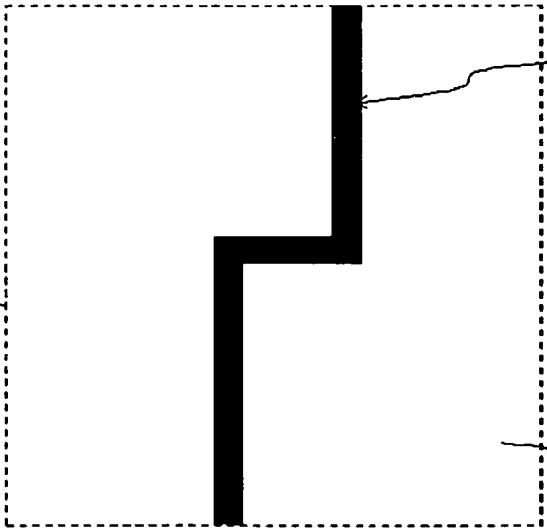
FIGS. 3A and 3B are schematic views explaining an image of an IC chip which is obtained by the non-destructive testing method of an embodiment of the present invention.
Figure 3A:
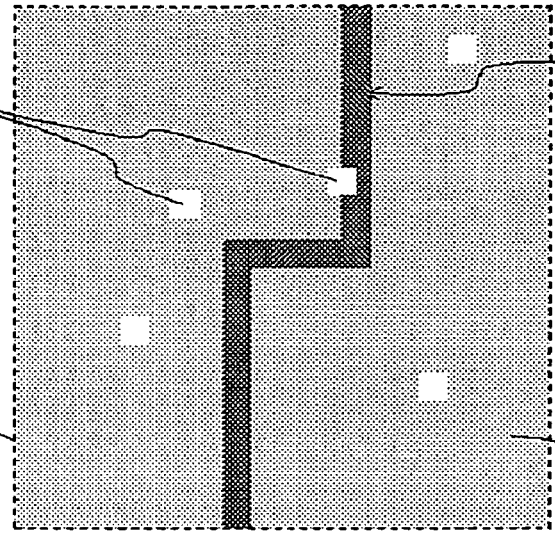

Now, a non-destructive testing method of one embodiment of the present invention will be described with reference to the drawings. FIGS. 3A and 3B are schematic diagrams explaining an image of an IC chip which is tested in accordance with the non-destructive method of one embodiment of the present invention. FIG. 3A shows an optical image and FIG. 3B shows an image of the temperature distribution. FIGS. 4A, 4B and 4C are schematic diagrams showing a method for detecting defects on an electronic device in accordance with the non-destructive testing method of one embodiment of the present invention.

Referring now to FIG. 3A, wirings are disposed on an interlayer dielectric layer at an area at which the optical image of the IC chip is observed. For convenience, a case where only one wiring is disposed on a layer is illustrated. Any defect of the IC chip can not be optically identified in the optical image.

Referring now to FIG. 3B, even if the temperature distribution image is observed by means of MCT type emission microscope while irradiation and heating is conducted by an ultra-red lamp, all defects of the interlayer dielectric, wirings and defects thereon can not necessarily be observed at the beginning stage on the temperature distribution image due to the relation of S/N. However, as the accumulation of the images is proceeded, the images will become more clear so that the defects of the interlayer dielectric (insulator), wirings and the defects thereof can be gradually observed. The thus observed defects are those that were not identified through the optical observation due to the fact that they were hidden within the wiring(s) and/or interlayer dielectric, or they were too small.

FIGS. 4A through C show the temperature distribution of the IC chip of FIG. 3A which is heated by ultra-red laser light scanning and is observed by a MCT type emission microscope. FIG. 4A shows accumulated temperature distribution image which is observed by MCT type emission micro-scope when scanning of the laser light is proceeded to a position corresponding to the 163th scanning line. At this phase, 2 defects in the dielectric are detected. FIG. 4B shows MCT accumulated image which is observed when scanning is advanced to the 279th line. While a wiring is observed at this phase, no defect thereof is observed, yet. FIG. 4C shows the image which is observed when scanning is advanced to the 512th line. At this phase, all defects are observed similarly to the case of FIG. 3B.

In such a manner, all defects can be immediately detected if the chip is simultaneously irradiated by a lamp although all defects can not be immediately detected if the scanning is conducted by using a laser light. On the other hand, the laser light has an advantage that it is excellent in efficiency and sensitivity since the laser light can be focused on the surface of the chip or its vicinity so that it can locally heat same. The wave length of the laser light used for this method may be either of about 1300 nm which is used in OBIRCH method or about 1064 nm used in reverse side Optical Beam Induced Current (OBIC) method. If the chip is heated by the OBIRCH method, then a wave length around 1065 nm could not be used since noise is caused by the generation of OBIC. There is no such restriction in the method of this embodiment since OBIC does not cause noise.

In practice, not all the defects can be clearly visible as shown in this case, it is of course possible that testing is conducted by presetting a suitable threshold to discriminate between noise and defects and by comparing tested chip with a qualified chip having no defect. It is of course possible that an enhancement in spatial solution of the temperature distribution image is achieved by relying upon the relation between the heat conduction time period and observation time period by appropriately adjusting $\tau_h, \tau_{h0}, \tau_o, \tau_{oh}$ in FIG. 2 depending upon needs.

In such a manner, any defects in wiring or dielectric film at which a current path does not exist, or these very difficult to detect by conventional non-destructive testing method can be easily detected by the present embodiment. In other words, the present invention is applicable to identification of voids, high resistive positions, testing of semiconductor devices, rejection analysis and defect analysis.

Figure 5:
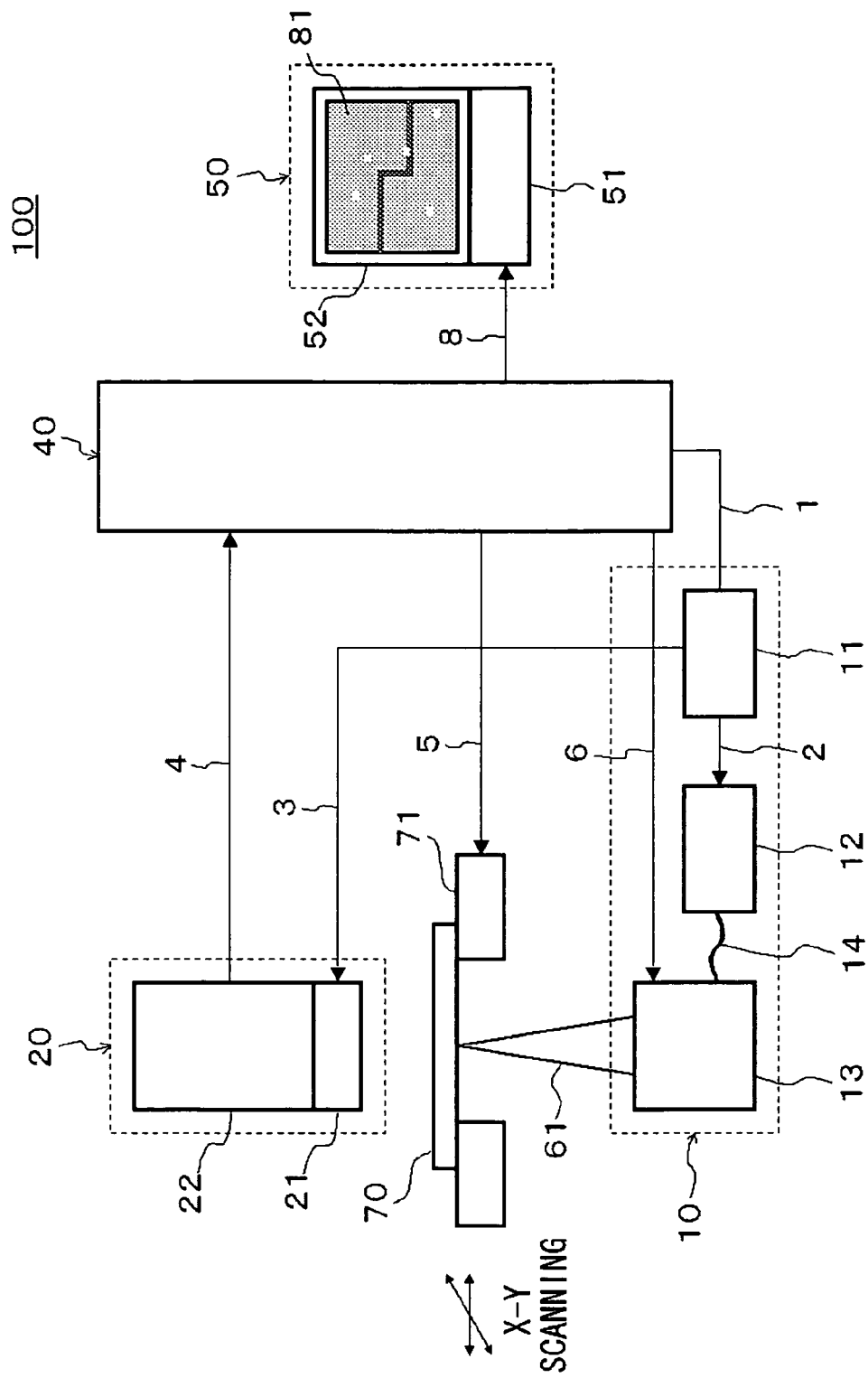
FIG. 5 is a schematic view schematically showing the structure of the non-destructive testing apparatus of one embodiment of the present invention.
Figure 6A:
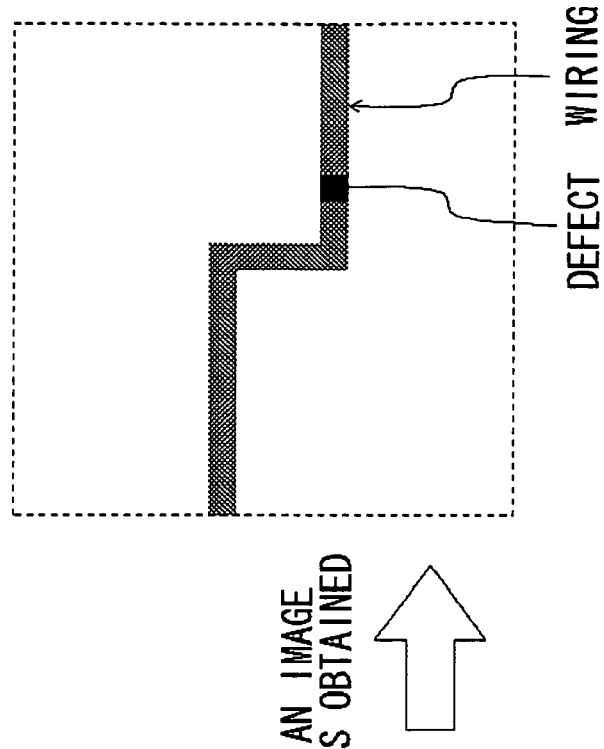
FIGS. 6A and 6B are views explaining prior art OBIRCH method.
Figure 6B:
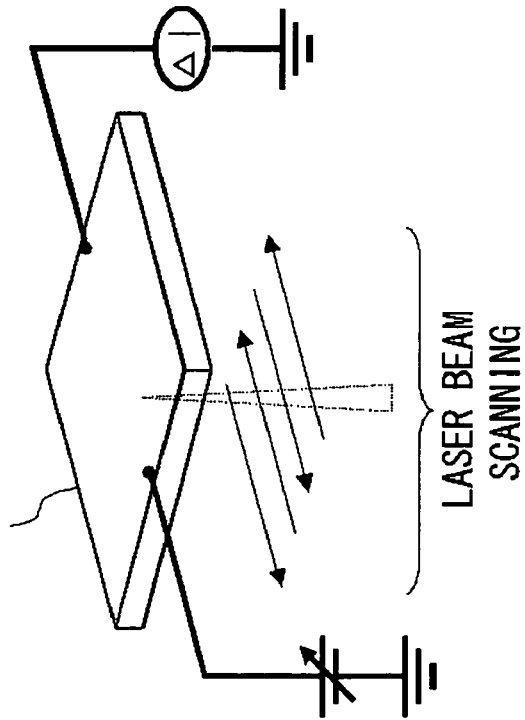

A non-destructive testing apparatus of one embodiment of the present invention will now be described with reference to drawings. FIG. 5 is a schematic diagram showing the structure of the non-destructive testing apparatus according to one embodiment of the present invention.

The non-destructive testing apparatus 100 comprises a laser light generating unit 10, an observation unit 20, a system control unit 40, a display unit 11 and a sample table 71. A sample 70 disposed on the sample table 71 is an electronic part such as semiconductor device to be tested.

The laser light generating unit 10 is a heat source for heating the sample in interest from the reverse side thereof. The laser light generating unit 10 emits laser light 6, which is turned on or off toward the sample 70. The laser light generating unit 10 comprises a heating-detecting timing control unit 11, ultra-red laser light generator 12, optical system unit 13 and an optical fiber 14.

The heating detecting timing control unit 11 controls the timing of turning on or off of the laser light output from the ultra-red light generator 12 based upon a heating detecting timing signal 1 from the system control unit 40, so that it outputs the laser light control signal 2 for this purpose to the ultra-red laser light generator 12. The heating detecting timing control unit 11 controls the timing of opening and closing of a shutter 21 of the observation unit 20 based upon the heating detecting timing signal 1 from the system control unit 40, so that it outputs a shutter control signal 3 for this purpose to the shutter 21.

The ultra-red laser light generator 12 generates laser light which is turned on or off in response to the laser light control signal from the heating detecting timing control unit 11 and outputs the generated laser light toward an optical system unit 13 through the optical fiber 14. The optical system 13 converges the laser light which is guided through the optical fiber 14 to generate laser light 61 and outputs the generated laser light 61 toward the sample 70 mounted on the sample table 71. The optical fiber guides laser light output from the ultra-red laser light generator 12 to the optical system unit 13.

The observation unit 20 observes the distribution of temperature on the sample 70 which is irradiated with laser light 61 at the (upper) face side thereof. The observation unit 20 comprises the shutter 21 and an MCT type (mercury cadmium telluride) emission micro scope 22. The shutter 21 controls the arrival of radiated heat at the MCT type emission microscope 22 from the sample 70. The MCT type emission microscope 22 is an ultra-red ray detector which observes the temperature distribution on the sample 70 for outputting a temperature distribution signal 4 to the system control unit 40.

The system control unit 40 controls the stage scanning on the sample table 71 and laser scanning of the optical system unit 13 as well as controls and instructs the heating detecting timing of the heating detecting timing control unit 11.

The system control unit 40 outputs a stage scanning signal 5 for controlling the position of the sample 70 mounted on the sample table 71 thereto to scan the sample table as shown in FIG. 4. Scanning as shown in FIG. 4 may conducted by controlling the optical system unit 13 in response to a laser canning signal 6 according to needs while the sample 70 is irradiated with the laser light 61 by scanning the laser light thereon.

The system control unit 40 also controls the apparatus so that a signal which is obtained by detecting laser light 61 reflected from the sample 70 by means of a photo-diode (not shown) is displayed as a laser scanning microscope image corresponding to the optical image of FIG. 3A in synchronization with the stage scanning, laser scanning and laser light irradiation position. The system control unit controls the synchronized display of the resultant laser scanning microscope image and temperature distribution image obtained from the temperature distribution signal 4 and outputs the image display signal 8 for this purpose to a computer 51.

The display unit 50 displays a temperature distribution image 81 based upon the image display signal 8 from the system control unit 40. The display unit 50 comprises a computer 51 and display 52. The computer 51 causes the display 52 to display the temperature distribution image 81 as well as the laser scanning microscope image and the like which is used for matching the position therewith. It is of course that a printer or file device may be used in addition to the display 52.

The sample table S1 is a stage on which the sample is placed and has a function to move the sample 70 to such a position that it may be irradiated with the laser light 61.

It is of course that a reflection signal which is generated by laser light irradiation may be detected by a photo-diode and is displayed as the laser scanning microscope image in a position corresponding to the temperature distribution image. The sample 70 may be IC chip or Si wafer. A compound semiconductor wafer and TFT substrate may be placed.

Now, operation of the non-destructive testing apparatus of one embodiment of the present invention will be described.

While the sample 70 is placed on the table 71 in the non-destructive testing apparatus as shown in FIG. 5, a laser light control signal 2 and a shutter control signal 3 which is synchronized with the former signal are generated in the heating detecting timing control unit 11. The shutter control signal 2 is output to the observation unit 20. The laser light control signal 2 is output to the ultra-red light generator 12 made of a fiber laser (having, for example, a wave length of 1065 nm) so that the laser light is introduced to the optical system unit through the optical fiber 14 for focusing the laser light upon the sample 70.

Timing between the laser light control signal 2 and the shutter control signal 3 which is synchronized with the former signal is controlled as described with reference to FIG. 2. Opening and closing of first shutter in FIGS. 1A, 1B and 2 corresponds to turning on and off of the laser responsive to the laser light control signal 2 of FIG. 5, respectively. Opening and closing of second shutter in FIGS. 1 and 2 corresponds to opening and closing of the shutter 21 responsive to the shutter control signal 3 in FIG. 5, respectively.

Thereafter, the temperature distribution formed on the sample 70 which is irradiated with laser light 61 is observed at the MCT type emission microscope 22. The image of the temperature distribution is formed by the system control unit 40 and is displayed on the display unit 50.

Since laser light having a wave length of 1065 nm is used, if the sample 70 is Si wafer, the laser light which is emitted from on the reverse side of the wafer can be transmitted through Si substrate to wirings in the vicinity of the surface of Si wafer. It is preferable to mirror-polish the reverse side of the Si wafer. By doing so, the laser light 61 which is emitted from the reverse side of the Si wafer can be effectively transmitted to the wirings.

Although the present invention has been described by way of embodiments, it is to be noted that the present invention is not limited to this embodiment and various modifications and alternations may be made by those skilled in the art with the scope and spirit of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A non-destructive testing method comprising:
    allowing a sample to stand for a predetermined period of time after heating said sample with a heat source;
    observing the temperature distribution formed on said sample by an observation unit after said predetermined period of time has elapsed; and
    detecting the presence or absence of a defect in the sample,
    wherein said heat source heats said sample from the reverse side thereof,
    wherein said observation unit observes the temperature distribution formed on said sample from the face side thereof, and
    wherein said heat source is a substantially ultra-red laser light that is emitted toward said sample.

2. A non-destructive testing method as defined in claim 1 wherein said sample is intercepted from said heat source by a shutter so that heat from said heat source is not transmitted to said observation unit and said sample during observation of the temperature distribution of said sample.

3. A non-destructive testing method as defined in claim 1 wherein, during observation of the temperature distribution on said sample, no laser light is output so that heat from said heat source is not transmitted to said observation unit and said sample.

4. A non-destructive method as defined in claim 1 wherein said sample is isolated from said observation unit by a second shutter so that no heat from said heat source is transmitted to said observation unit during heating of said sample.

5. A non-destructive testing method as defined in claim 1 wherein said observation unit includes mercury cadmium telluride type emission microscope.

6. A non-destructive testing apparatus comprising:
    a heat source that heats a sample; and
    an observation unit that observes the temperature distribution formed on said sample after allowing said sample to stand for a predetermined period of time after heating said sample,
    wherein said heat source heats said sample from the reverse side thereof,
    wherein said observation unit observes the temperature distribution formed on said sample from the face side thereof, and
    wherein said heat source emits a substantially ultra-red laser light toward said sample.

7. A non-destructive testing apparatus as defined in claim 6 wherein said apparatus includes a first shutter which intercepts said sample from said heat source so that heat from said heat source is not transmitted to said observation unit and said sample during observation of the temperature distribution of said sample.

8. A non-destructive testing apparatus as defined in claim 6 wherein said heat source is capable of stopping of outputting of laser light toward said sample so that heat from said heat source is not transmitted to said observation unit and said sample during observation of the temperature distribution on said sample.

9. A non-destructive apparatus as defined in claim 6 wherein said apparatus includes a second shutter which isolates said sample from said observation unit by a second shutter so that no heat from said heat source is transmitted to said observation unit during heating of said sample.

10. A non-destructive testing apparatus as defined in claim 6 wherein said observation unit includes mercury cadmium telluride type emission microscope.

* * * * *